UNITED STATES PATENT OFFICE.

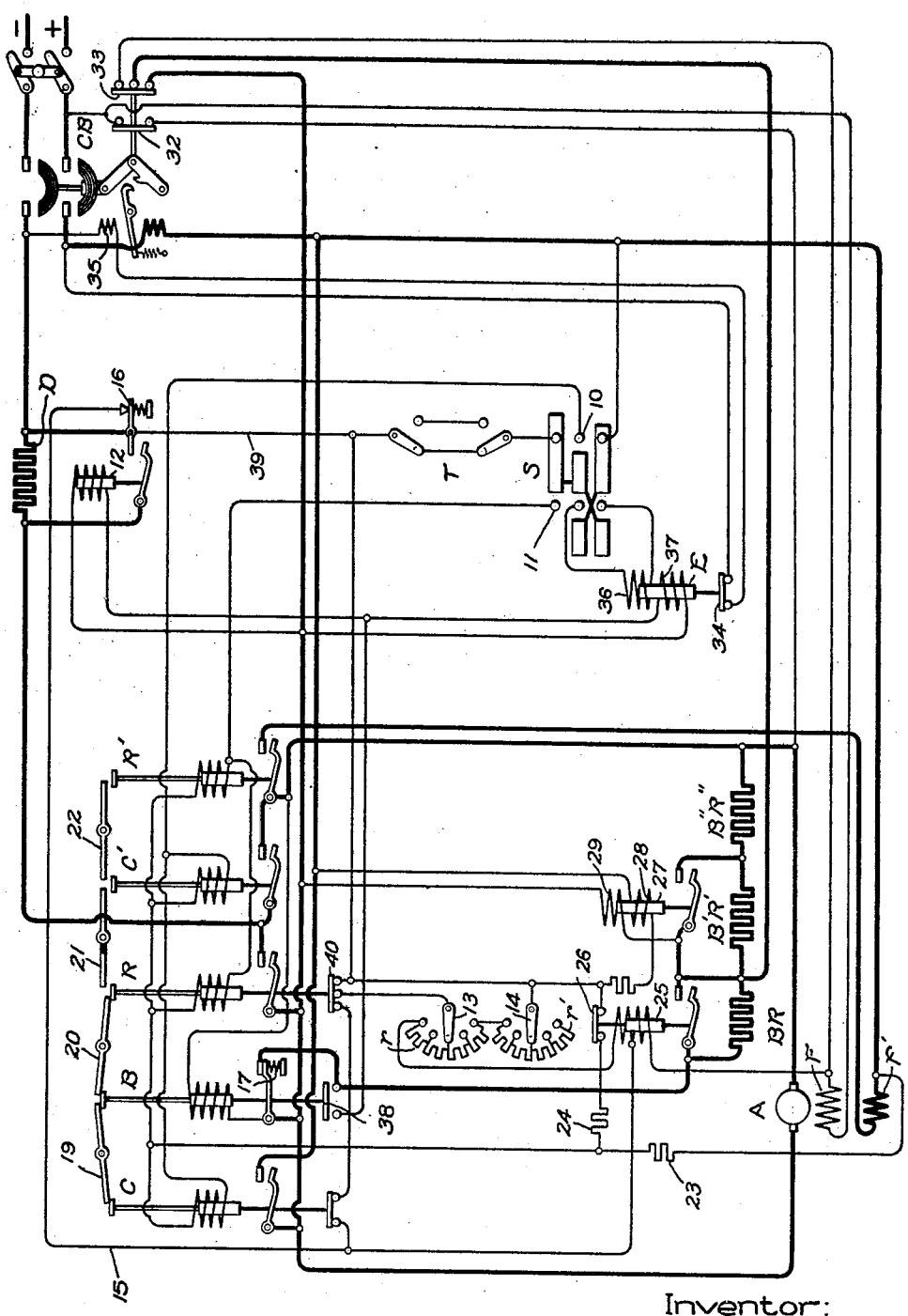

JOHN EATON, OF SCHENECTADY, NEW YORK, ASSIGNOR TO GENERAL ELECTRIC COMPANY, A CORPORATION OF NEW YORK.

CONTROL SYSTEM FOR ELECTRIC MOTORS.

1,275,880.  Specification of Letters Patent.  Patented Aug. 13, 1918.

Application filed May 11, 1915. Serial No. 27,433.

*To all whom it may concern:*

Be it known that I, JOHN EATON, a subject of the King of Great Britain, residing at Schenectady, county of Schenectady, State of New York, have invented certain new and useful Improvements in Control Systems for Electric Motors, of which the following is a specification.

My invention relates to a control system for electric motors and has for its object the provision of means whereby the motor may be started, stopped and generally controlled in a reliable and efficient manner.

My invention relates more specifically to the operation of electric motors which it is desired shall be brought to rest quickly. It is frequently desirable to bring a motor to rest very quickly as for instance in the case of electrically driven machines, such as planers or the like where the motor must be stopped very quickly when the end of the stroke is reached. This quick stopping is commonly accomplished by closing a dynamic braking circuit, that is short-circuiting the armature through more or less resistance. This dynamic braking circuit is generally controlled by a switch which closes under electromagnetic control when the reversing switch is operated. If this switch should fail to close, so as to close the dynamic braking circuit, disastrous results might follow since the motor would not stop at the desired point but would continue to operate due to the inertia of the parts.

One object of my invention is to provide means whereby the motor will be brought to rest quickly in case of failure of the dynamic braking circuit to properly close. In my previous application, Serial No. 817,365, filed Feb. 7, 1914, I have disclosed a circuit breaker in connection with electrically driven planers which, when it opens, causes the motor to be quickly stopped. My present invention utilizes a similar circuit breaker arrangement for stopping the motor in connection with means whereby the circuit breaker will be opened and the motor quickly stopped in case the dynamic braking circuit is not closed at the proper time.

In the form illustrated herein, I provide an electromagnetic relay which will trip the circuit breaker by deënergizing its no-voltage release magnet in case of failure of the dynamic braking circuit to close. This relay is provided with two windings which are normally differential with respect to each other so that the relay will not operate to trip the circuit breaker. One of these coils is connected across the line through the reverse switch so that its polarity is reversed with each operation, while the other is connected across the armature and therefore has its polarity reversed when the armature reverses. The circuit of this second coil is closed only when the dynamic braking circuit is open. During normal operation of the motor, the dynamic braking circuit is open and the two windings will be differentially energized. When the reverse switch is thrown over, however, the winding which is connected to the reversing switch has its polarity changed so as to assist the other winding and the relay will, therefore, close if by any chance the braking contactor is still open. If the braking circuit is closed by the closure of the electromagnetic switch or braking contactor as it should be when the reversing switch is operated only one of the windings will be energized and the relay will not operate. In other words, the relay will never operate to trip the circuit breaker, unless, upon the throwing of the reversing switch, the dynamic braking switch does not immediately close.

In the accompanying drawing is shown diagrammatically one embodiment of my invention. The general features of the control in so far as concerns the starting, dynamic braking and reversing are the same as disclosed in my previous application above referred to. In order, however, that the mode of operation may be clearly understood, I shall first describe my invention as a whole and then point out the features of novelty.

Referring therefore to the drawing, A represents the armature, F the shunt field and F' the series field of an electric motor for driving a planer or the like. The direction of rotation of this motor is controlled by four electromagnetic switches or contactors, two for each direction of rotation. Two of these switches are designated C and C' respectively since they cause the motor to operate in the "cutting" direction. The other two switches are designated R and R' since when closed they cause the motor to operate in the direction to drive a planer in the "return" direction. These four switches are operated by shunt windings and by master switches. In the drawing the parts are shown in the position which they occupy when the circuit breaker is open and all the parts deënergized. When the line is energized by the closing of the circuit breaker CB and the master switch S is moved so as to engage the finger 10, the windings of contactors C and C' are energized in parallel across the line, while when the master switch is moved to the opposite position so as to engage the finger 11 the windings of the two contactors R and R' are similarly connected across the line. Starting resistance D for the motor is controlled by the electromagnetic switch 12 which closes and short circuits the resistance when the counter-electro-motive force of the motor rises to a predetermined value. For varying the speed of the motor, I provide two rheostats, one of which has a resistance $r$ which is controlled by the arm 13 while the other has a resistance $r'$ controlled by the arm 14. When the motor is started, the switch 12 is open and both the resistance $r$ and $r'$ are short-circuited through the wire 15 and the switch 16 which is spring closed. When the switch 12 closes the switch 16 is opened so as to break the short circuit. When the master switch is in engagement with the finger 10, that is in the "cutting" position, a portion of the resistance $r$, the amount of which will depend upon the position of the arm 13, will be connected in the field circuit. When the master switch is moved to the opposite position, the connection of the arm 13 to the rheostat is broken by the closing of the line contactor R so that all of the resistance $r$ as well as a portion of the resistance $r'$, depending upon the position of the arm 14, will now be in the field circuit.

In order to bring the motor armature to rest quickly I provide a brake resistance through which the motor armature is short-circuited. This brake resistance is divided into three sections, BR, B'R' and B"R". The purpose of these sections, is to graduate the dynamic braking current as the field builds up and the motor slows down. For making the dynamic braking connections, I provide a contactor B which is normally closed by a spring 17. The winding of this contactor is connected across the armature of the motor so that while the motor is operating, the winding tends to close the switch. The five contactors R, R', C, and C' and B being arranged as shown in the drawing are provided with mechanical interlocks 19, 20, 21 and 22 coöperating with the contactors so as to compel operation in a predetermined manner.

The line contactors are provided with means for preventing their closure except when the field of the motor is of a predetermined strength. This means consists of resistance 23 and 24, interlocked as hereinafter described with the contactor which controls the brake resistance BR. An electromagnetic switch or contactor 25 is provided with a winding having one terminal connected with the shunt field while the other terminal is connected with the resistance $r$. The winding of this contactor is divided into two halves which are differential or opposed to each other so that when the two halves are energized they neutralize each other and the contactor will not close. It will be seen that when the switch 16 is open, the field circuit must pass through the two differential portions of the contactor winding and through any field resistance which may be in circuit. The contactor is therefore inoperative under this condition. When, however, the switch 16 is closed, the upper half of the contactor winding and the resistance are short circuited so that one half of the winding is energized and the contactor becomes active. The winding of this contactor is so adjusted that when the field current approaches a maximum, that is when the field is nearly full strength, it will close but when the field is weak it will not close even though only one of the windings is energized. When the switch 16 closes, the field resistance is short-circuited so as to strengthen the field but the field increases gradualy due to the inductive effect and until the field current rises to a predetermined value which is preferably near the maximum, the contactor 25 will not operate. When it does operate, it short circuits the section of resistance BR. This contactor 25 is provided with an interlocking contact 26 connected with the resistance 24 in parallel with the windings of the line contactors so that when the contactor 25 closes, the circuit of the resistance 24 will be opened to permit the line contactors to close.

In order to obtain the same dynamic braking effect when the motor is stopped from high speed as when it is stopped from low speed, I provide an electromagnetic switch or contactor 27, which is so arranged that when the dynamic braking circuit is closed with the motor rotating in the "cutting" or forward direction, it will be closed, but will not close when the dynamic braking circuit is closed with the motor operating in the opposite or "return" direction. To this end, the contactor has two windings one of which 28 is connected across the line, while the other one 29 is connected across the motor armature. These two windings are so proportioned that when the counter electromotive force of the motor opposes the voltage applied to the winding 28, the contactor will remain open but when the counter electromotive force of the motor is reversed, it will close. This contactor is also arranged to be closed by the potential coil 28 alone so that when the counter electromotive force winding 29 is opposing the winding 28, it will not close until the counter electromotive force reaches a low value or when the motor speed drops to a proper point.

In order to stop the motor upon the failure of voltage, I provide a circuit breaker CB which is so arranged as to apply an effective dynamic brake to the motor when the circuit breaker opens. To this end, I provide in the particular form illustrated, two contacts, 32 and 33 which move in and out of engagement with fixed contacts as the circuit breaker closes and opens. Contact 33 engages with two contacts which close a dynamic braking circuit through the motor and the braking resistance B'R' and B"R". Contact 32 engages with two contacts one of which is connected with the field terminal while the other is connected with the armature circuit during dynamic braking. When the circuit breaker is open the armature circuit is made closed through the resistance B'R' and B"R" and the field circuit is closed across the armature in parallel with the braking resistance. This causes a very effective dynamic braking effect independent of the line voltage, since the field strength will be maintained by the closed circuit.

The feature of my present invention resides in the provision of means whereby the circuit breaker opens and brakes the motor in the case of failure of the brake contactor B to close when the reversing switch S is thrown over. In the arrangement shown, I provide a relay E having a contact 34 which controls the circuit of the no-voltage release magnet 35 of the circuit breaker. That is when the relay E is deënergized, or inoperative, the circuit of the no-voltage release coil will be completed but when the relay E is energized and operates, it opens the circuit of the no-voltage release magnet and trips the circuit breaker. This relay E is provided with two windings which are adapted to give substantially equal magnetization so that when they are differential or opposed, they neutralize each other and the relay will not operate. One of these windings 36 is connected across the line through the reversing switch S so that each time the reversing switch is operated, the direction of current through it is reversed. The other winding 37 is connected across the motor armature so that each time the motor armature reverses the direction of current through it is reversed. The circuit of this winding 37 is through a contact 38 on brake contactor B so that it will only be complete when the brake contactor is open. During normal operation of the motor these two windings 36 and 37 will oppose each other and the relay will not operate. When the reversing switch is operated, the direction of current through winding 36 is reversed so as to be the same as that of the winding 37 but if the brake contactor has acted properly, that is, if it has closed, the winding 37 will not be energized. There will therefore, be only one winding 36 energized at this time and this winding is insufficient to operate the relay. If, however, upon throwing the reversing switch S brake contactor B does not close, then the two windings 36 and 37 will be energized so as to assist each other and the relay will be operated, thereby deënergizing the no-voltage release coil 35 and tripping the circuit breaker.

As thus constructed and arranged, the mode of operation of my device is as follows: Assuming the circuit breaker CB to be closed and assuming that the master switch or controller S has been moved by the dog on the planer into engagement with the finger 10, contactors C and C' will be energized from the positive side of the line, through the resistance 23, thence through the windings of contactors C and C' in parallel to the controller finger 10, thence through the controller and the contacts of the switch T to the negative side of the line. The resistance 24 is in a parallel circuit with the contactors C and C', the circuit through this resistance 24 extending through the interlock 26 and back to the negative side of the line through the wire 39. These resistances are so adjusted that the contactors C and C' will not close until the parallel circuit through the resistance 24 is opened. The field circuit is made from the negative side of the line, through the switch 16, wire 15, thence through the lower coil of the winding of contactor 25 and field winding F to the positive side of the line. The contactor 25 will therefore close, but not until the field has become energized at substantially full strength. When the contactor 25 closes, the closing of its main contacts at this time has no effect, but the opening of the interlock 26 opens the circuit of the parallel resistance 24 and causes the contactors C and C' to close. The line contactors therefore do not close until the field has reached substantially full strength. The contactor 27 will also close, since its its lower winding 28 is connected across the line, and the winding 29, which is a counter-electromotive force coil gradually becomes energized in a direction to assist winding 28. Contactors C and C' as well as contactor 25 and contactor 27 are now closed and the armature circuit of the motor is therefore closed from the positive side of the line, through the contacts of contactor C, armature A, contactor C' and resistance D to the negative side of the line. The motor will now start in the "cutting" direction and as the armature speeds up the contactor 12 will close to short-circuit the resistance D in the armature circuit. As soon as this contactor 12 closes the wire 15 which short-circuits the field resistances $r$, $r'$, is open circuited, and the field current now flows through the wire 39 through the interlocking contacts 40 on the contactor R, through a portion of resistance $r$, thence through the two windings of the contactor 25 to the field winding, then back to line. This causes the motor to speed up due to the insertion of the resistance $r$ in the field circuit and causes the contactor 25 to open. The motor now runs at full speed in the "cutting" direction.

When the end of the stroke is reached the master switch S is thrown over into engagement with the finger 11, thereby de-energizing the contactors C and C' and energizing contactors R and R'. Immediately upon the opening of the contactor C the brake contactor B which has been trying to close, due to the energization of its winding across the armature, and also due to the spring 17, closes. This closes a dynamic brake circuit through the motor from the left hand brush through the contacts of brake contactor B, through the brake resistance BR, through the contacts of contactor 27 and brake resistance B"R" to the other brush. It will be noted that the contactor 27 is closed because, in this case, the counter electromotive force of the motor is in a direction to assist the winding 28, which is across the line. The contactor 27 remains closed upon dynamic braking and the initial dynamic braking action therefore takes place through only a portion of the braking resistance. At the same time that the line contactors C and C' open the starting resistance contactor D opens, thereby short-circuiting the field resistance and the upper winding of the contactor 25 through the wire 15. The contactor 25 will therefore close as soon as the field strength builds up. When it does close, the dynamic braking current is increased and the motor is brought quickly to rest. Upon the closing of this contactor 25, the circuit of the resistance 24 is opened at the interlock 26 so that the contactors R and R' may close. These contactors can only close, therefore, when the motor is brought substantially to rest for the additional reason that the contactors R and R' cannot close until the brake contactor is opened.

Suppose however, that when the master switch S is thrown over as above described, the brake contactor B should fail to close for any cause. Under these circumstances, the dynamic brake would not be applied, and considerable damage might be caused were it not for the safety arrangement which I have provided. As heretofore described if this brake contactor fails to close, the circuit breaker will be tripped by reason of the fact that the two windings 36 and 37 will assist each other and open the circuit of the no-voltage release coil of the circuit breaker through contact 34. The opening of the circuit breaker causes the motor to be stopped very quickly, in fact the brake applied by the opening of the circuit breaker is intended to stop the motor more quickly than when the dynamic brake is applied by the closing of the brake contactor B. It is intended that the motor shall be stopped by the opening of the circuit breaker at least as soon after the throwing over of the reversing switch as if the brake contactor had acted, and this, notwithstanding the slight delay in the applying of the brake at the circuit breaker due to the fact that the relay E must have time to act and the circuit breaker must have time to fully open. In the arrangement shown in the drawing, the braking effect is applied to the motor by dynamic braking which includes less resistance in the armature circuit than in the dynamic brake circuit. In fact, this circuit may include very little resistance so as to bring the motor to rest almost instantly. Therefore, it will be seen that no damage can be done by the failure of the braking contactor to operate the only result being that the motor will be stopped until the circuit breaker is closed and the cause of the trouble at the brake contactor removed.

While I have described my invention as embodied in concrete form and as operating in a specific manner in accordance with the provisions of the patent statutes, it should be understood that I do not limit my invention thereto, since various modifications of my invention will suggest themselves to those skilled in the art, without departing from the spirit of my invention, the scope of which is set forth in the annexed claims.

What I claim as new and desire to secure by Letters Patent of the United States, is:—

1. In combination an electric motor, a controlling switch therefor, a braking circuit for dynamically braking the motor when the switch is operated, a circuit breaker provided with means whereby when it opens, it causes the motor to quickly stop and means for causing the circuit breaker to open in case the dynamic braking circuit does not close upon the operation of the switch.

2. In combination, an electric motor, a reversing mechanism therefor, a braking circuit for dynamically braking the motor when the reversing mechanism is operated, a circuit breaker provided with means whereby when it opens, it causes the motor to quickly stop and means for causing the circuit breaker to open in case the dynamic braking circuit does not close.

3. In combination, an electric motor, a braking circuit for dynamically braking the motor, an electromagnetic switch for controlling the braking circuit, a circuit breaker provided with means whereby when it opens, it causes the motor to quickly stop, and means for causing the circuit breaker to open in case of failure of the electromagnetic switch to operate and apply the dynamic brake.

4. In combination, an electric motor, a reversing mechanism therefor, a braking circuit for dynamically braking the motor when the reversing mechanism is operated, an electromagnetic switch controlling the braking circuit, a circuit breaker provided with means whereby when it opens, it causes the motor to be braked and means for causing the circuit breaker to open when the reversing mechanism is operated in case of the failure of the electromagnetic switch to operate and apply the dynamic brake.

5. In combination, an electric motor, a reversing mechanism therefor, a braking circuit for dynamically braking the motor, an electromagnetic switch controlled by the reversing mechanism for controlling the braking circuit, an automatic circuit breaker provided with means whereby when it opens it causes the motor to be braked and electromagnetic means controlled by the reversing mechanism and by the electromagnetic switch for causing the circuit breaker to open when the electromagnetic switch fails to properly function upon the actuation of the reversing switch.

6. In combination, an electric motor, a reversing mechanism therefor, a braking circuit for dynamically braking the motor, an electromagnetic switch controlled by the reversing mechanism for controlling the braking circuit, an automatic circuit breaker provided with means whereby when it opens it causes the motor to be braked, and a relay controlled by the reversing mechanism and by the electromagnetic switch so as to cause the circuit breaker to open when the electromagnetic switch fails to properly function upon the actuation of the reversing switch.

7. In combination, an electric motor, a reversing mechanism therefor, a braking circuit for dynamically braking the motor, an electromagnetic switch controlled by the reversing mechanism for closing the braking circuit, an automatic circuit breaker provided with means whereby when it opens it causes the motor to be braked, and means for opening the circuit breaker when the electromagnetic switch fails to close, said means comprising a relay, which operates to trip the circuit breaker when the reversing switch is operated in case the electromagnetic switch does not close the dynamic braking circuit.

8. In combination, an electric motor, a reversing mechanism therefor, a braking circuit for dynamically braking the motor, an electromagnetic switch controlled by the reversing mechanism for closing the braking circuit, a circuit breaker having a no-voltage release coil and provided with means whereby when it opens it causes the motor to be braked and means for opening the circuit breaker when the electromagnetic switch fails to close, said means comprising a relay which deënergizes the no-voltage coil of the circuit breaker when the reversing switch is operated in case the electromagnetic switch does not close the dynamic braking circuit.

9. In combination, an electric motor, a reversing mechanism therefor, a braking circuit for dynamically braking the motor, an electromagnetic switch controlled by the reversing mechanism for controlling the braking circuit, an automatic circuit breaker provided with means whereby when it opens it causes the motor to be braked and a relay controlling the tripping of the circuit breaker having differential windings one of which has its energizing current reversed by the reversing mechanism and the other by the counter electromotive force of the motor through contacts on the electromagnetic switch so that each winding will have its polarity reversed upon each reversal of the motor and thereby render the relay normally inoperative.

10. In combination, an electric motor, a reversing mechanism therefor, a braking circuit for dynamically braking the motor, an electromagnetic switch controlled by the reversing mechanism for controlling the braking circuit, an automatic circuit breaker provided with means whereby when it opens it causes the motor to be braked, and a relay controlling the tripping of the circuit breaker having two windings acting together to cause operation but normally differential to each other, one of said windings having its energizing current reversed by the reversing mechanism and the other by the counter electromotive force of the motor through contacts on the electromagnetic switch so that each winding will have its polarity reversed upon each reversal of the motor and thereby render the relay normally inoperative.

11. In combination, an electric motor, a reversing mechanism therefor, a braking circuit for dynamically braking the motor, an electromagnetic switch controlled by the reversing mechanism for closing the braking circuit, an automatic circuit breaker provided with means whereby when it opens it causes the motor to be braked and means for opening the circuit breaker when the electromagnetic switch fails to close, said means comprising a relay having two windings acting together to cause operation but normally differential to each other, one of said windings having its energizing current reversed by the reversing mechanism and the other by the counter electromotive force of the motor through contacts on the electromagnetic switch in its open position so that each winding will have its polarity reversed upon each reversal of the motor and thereby render the relay normally inoperative and the two windings will act together upon the operation of the reversing switch to actuate the relay and trip the circuit breaker in case the electromagnetic switch does not close.

In witness whereof, I have hereunto set my hand this 10th day of May 1915.

JOHN EATON.